(12) United States Patent  (10) Patent No.: US 8,583,924 B2
Caballero et al.  (45) Date of Patent: Nov. 12, 2013

(54) LOCATION-BASED FEATURE ENABLEMENT FOR MOBILE TERMINALS

(75) Inventors: Aldo Caballero, Charlotte, NC (US); Dan Yeakley, Monroe, NC (US)

(73) Assignee: Hand Held Products, Inc., Fort Mill, SC (US)

( * ) Notice: Subject to any disclaimer, the term of this patent is extended or adjusted under 35 U.S.C. 154(b) by 512 days.

(21) Appl. No.: 12/825,952

(22) Filed: Jun. 29, 2010

(65) Prior Publication Data

US 2011/0004756 A1  Jan. 6, 2011

Related U.S. Application Data (60) Provisional application No. 61/222,294, filed on Jul. 1, 2009.

(51) Int. Cl.
  *G06F 21/00* (2013.01)
  *G01S 19/42* (2010.01)
  *H04L 9/32* (2006.01)

(52) U.S. Cl.
  USPC .......................................... 713/168; 726/21

(58) Field of Classification Search
  None
  See application file for complete search history.

(56) References Cited

U.S. PATENT DOCUMENTS

| | | | | |
|---|---|---|---|---|
| 6,756,882 B2 * | 6/2004 | Benes et al. | ............... | 340/323 R |
| 6,985,588 B1 * | 1/2006 | Glick et al. | ................... | 380/258 |
| 7,315,925 B2 * | 1/2008 | Takaragi | ....................... | 711/163 |
| 7,571,857 B2 * | 8/2009 | Payne et al. | ............. | 235/462.13 |
| 7,577,516 B2 * | 8/2009 | Dobeck et al. | ............... | 701/490 |
| 7,945,070 B2 * | 5/2011 | Andrews et al. | .............. | 382/100 |
| 2002/0017977 A1 * | 2/2002 | Wall | ............................ | 340/5.28 |
| 2005/0071666 A1 * | 3/2005 | Chu et al. | ...................... | 713/200 |
| 2005/0181808 A1 * | 8/2005 | Vaudreuil | .................. | 455/456.3 |
| 2005/0277428 A1 * | 12/2005 | Nathan Brown | ........... | 455/456.3 |
| 2006/0075230 A1 * | 4/2006 | Baird et al. | .................... | 713/168 |
| 2006/0223528 A1 * | 10/2006 | Smith | ....................... | 455/432.3 |
| 2006/0226598 A1 * | 10/2006 | Walker et al. | .............. | 273/138.1 |
| 2006/0277312 A1 * | 12/2006 | Hirsch | .......................... | 709/229 |
| 2007/0060358 A1 | 3/2007 | Amaitis et al. | | |
| 2007/0101438 A1 * | 5/2007 | Govindarajan | ................ | 726/27 |
| 2007/0204163 A1 * | 8/2007 | Andrews et al. | .............. | 713/176 |
| 2007/0276583 A1 * | 11/2007 | Dobeck et al. | ................ | 701/200 |
| 2008/0019317 A1 * | 1/2008 | Vellanki et al. | ............... | 370/331 |
| 2008/0026767 A1 * | 1/2008 | Krstulich | .................. | 455/452.2 |
| 2008/0048971 A1 * | 2/2008 | Beckhusen et al. | ........... | 345/156 |
| 2008/0123262 A1 * | 5/2008 | Coleman et al. | .............. | 361/680 |
| 2008/0182592 A1 * | 7/2008 | Cha et al. | ................... | 455/456.3 |
| 2008/0185432 A1 * | 8/2008 | Caballero et al. | ............. | 235/435 |

(Continued)

OTHER PUBLICATIONS

Nov. 21, 2012 European Search Report in European Application No. 10167908.2.

(Continued)

*Primary Examiner* — Haresh N Patel (74) *Attorney, Agent, or Firm* — Additon, Higgins, Pendleton & Ashe, P.A.

(57) ABSTRACT

A computing device to enable a feature thereof according to a current location and a control method thereof, the computing device including: a location unit to determine the current location of the computing device; and a licensing unit to determine whether the current location corresponds to a predetermined authorized location, and to enable the feature if the current location corresponds to the authorized location. Accordingly, a permission to use a software feature or a hardware feature of the computing device can be controlled according to the current location of the computing device.

11 Claims, 5 Drawing Sheets

(56) References Cited

U.S. PATENT DOCUMENTS

| | | | |
|---|---|---|---|
| 2008/0209521 A1* | 8/2008 | Malaney | 726/4 |
| 2008/0222707 A1* | 9/2008 | Pathuri et al. | 726/4 |
| 2008/0235230 A1* | 9/2008 | Maes | 707/9 |
| 2008/0311994 A1* | 12/2008 | Amaitis et al. | 463/39 |
| 2009/0044003 A1* | 2/2009 | Berthiaume et al. | 713/100 |
| 2009/0066528 A1* | 3/2009 | Bickel et al. | 340/657 |
| 2009/0149192 A1* | 6/2009 | Vargas et al. | 455/456.1 |
| 2009/0157418 A1* | 6/2009 | Coleman et al. | 705/1 |
| 2009/0157560 A1* | 6/2009 | Carter et al. | 705/80 |
| 2009/0161994 A1* | 6/2009 | Sauerwein et al. | 382/313 |
| 2009/0164118 A1* | 6/2009 | Breen | 701/207 |
| 2009/0177603 A1* | 7/2009 | Honisch | 706/45 |
| 2009/0197684 A1* | 8/2009 | Arezina et al. | 463/42 |
| 2009/0203352 A1* | 8/2009 | Fordon et al. | 455/406 |
| 2009/0222669 A1* | 9/2009 | Huang et al. | 713/182 |
| 2010/0017874 A1* | 1/2010 | Piccinini et al. | 726/18 |
| 2010/0062788 A1* | 3/2010 | Nagorniak | 455/456.1 |
| 2010/0107238 A1* | 4/2010 | Stedman et al. | 726/13 |
| 2010/0109835 A1* | 5/2010 | Alrabady et al. | 340/5.2 |
| 2010/0291907 A1* | 11/2010 | MacNaughtan et al. | 455/414.1 |
| 2010/0314443 A1* | 12/2010 | Cudzilo | 235/435 |
| 2012/0036559 A1* | 2/2012 | Zabawskyj et al. | 726/4 |

OTHER PUBLICATIONS

Dec. 17, 2012 Communication Pursuant to Article 94(3) EPC in European Application No. 10167908.2.

* cited by examiner

LOCATION-BASED FEATURE ENABLEMENT FOR MOBILE TERMINALS

CROSS-REFERENCE TO RELATED APPLICATION

This application claims the benefit of U.S. Provisional Patent Application Ser. No. 61/222,294, filed Jul. 1, 2009, which is hereby incorporated herein by reference in its entirety.

BACKGROUND OF THE INVENTION

1. Field of the Invention

Aspects of the present invention relate to a mobile terminal and a control method thereof, and more particularly, to a mobile terminal with location-based provisioning for license keys of software and/or hardware features and a control method thereof.

2. Description of the Related Art

Generally, computing devices can be thought of as falling into two classes: fixed and mobile. Fixed terminals are generally incorporated into stationary objects (such as point of sale systems and walls). Mobile terminals have similar electronic configurations as compared to fixed devices, but are mechanically designed to be carried around by a user or mounted on movable objects (such as cars, carts, and fork lifts). For example, the mobile terminal may be a navigation system, a phone, a personal digital assistant (PDA), or a portable data terminal (PDT).

Recently, computing devices have been equipped with internal or external Global Positioning System (GPS) receivers. The GPS receiver dynamically provides location, direction, and/or speed information of the computing device at any given time. In particular, the location information takes the form of a coordinate pair (latitude and longitude). The location information is then displayed to a user, or otherwise used in the computing device. For example, the location information can be input to an executing software program to load nearby restaurants and attractions.

However, the location information does not control a licensing (i.e., a permission to use) of the computing device or hardware and software features thereof. Rather, license keys control a licensing of a software or hardware feature installed in a computing device. In particular, the software or hardware feature is installed in the terminal, and a permission to use the software or hardware feature is granted with a proper license key.

The license key may be transmitted to the computing device in a variety ways (for example, provisioned via a network from a license key server). However, after the license key is received by the computing device, using the license key to permit use of the corresponding hardware or software feature is generally unrestricted. For example, a software manufacturer is unable to control a use of its software according to the location of a computing device that executes the software. Accordingly, there is a need for a method of controlling a use of a software or hardware feature of a computing device according to a location of the software or hardware feature.

SUMMARY OF THE INVENTION

Aspects of the present invention provide a computing device with location-based provisioning for license keys of software and/or hardware features, and a control method thereof.

According to an aspect of the present invention, there is provided a computing device to enable a feature thereof according to a current location, the computing device including: a location unit to determine the current location of the computing device; and a licensing unit to determine whether the current location corresponds to a predetermined authorized location, and to enable the feature if the current location corresponds to the authorized location.

According to another aspect of the present invention, there is provided a method of enabling a feature of a computing device according to a current location of the computing device, the method including: determining the current location of the computing device; determining whether the current location corresponds to a predetermined authorized location; and enabling the feature if the current location corresponds to the authorized location.

According to still another aspect of the present invention, there is provided a portable data terminal (PDT) to enable a feature thereof according to a current location, the PDT including: a Global Positioning System receiver to determine the current location of the PDT; at least one memory unit to store at least one software feature; at least one data input device to receive a user input; a display unit to display data generated by the PDT; at least one communication unit to transmit and/or to receive data to/from an outside source; at least one data collection subsystem to generate data according to a received waveform or collected light; and at least one processing unit to determine whether the current location corresponds to a predetermined authorized location, and to enable one or more of the at least one data input device, the display unit, the at least one communication unit, the at least one data collection subsystem, and/or the at least one software feature if the current location corresponds to the authorized location.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Figure 1:
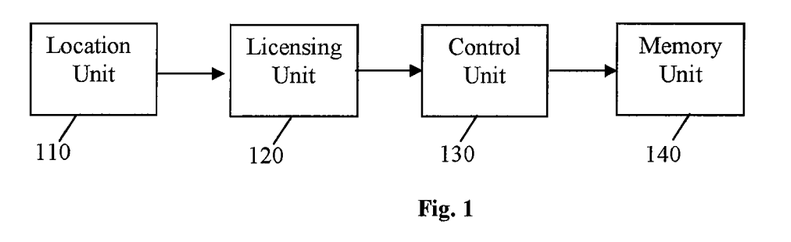
FIG. 1 is a block diagram of a computing device according to an embodiment of the present invention.

FIG. 1 is a block diagram of a computing device according to an embodiment of the present invention. Referring to FIG. 1, the computing device includes a location unit 110, a licensing unit 120, a memory unit 130, and a control unit 140.

The location unit 110 determines a current location of the computing device. Furthermore, the location unit 110 may generate location information including a coordinate pair (such as a longitude and latitude coordinate pair) corresponding to the current location of the computing device. The location unit 110 may be a Global Positioning System (GPS) receiver.

The licensing unit 120, which may be a run time module, determines whether the current location determined by the location unit 110 corresponds to a predetermined authorized location. Specifically, the licensing unit 120 may determine if the generated coordinate pair corresponds to a predetermined authorized coordinate pair. For example, if the authorized location is (25 degrees, 25 minutes, and 25 seconds north of the equator, and 25 degrees, 25 minutes and 25 seconds west), the licensing unit 120 determines if the location information generated by the location unit 110 includes (25 degrees, 25 minutes, and 25 seconds north of the equator, and 25 degrees, 25 minutes and 25 seconds west). It is understood that aspects of the present invention are not limited to one specific coordinate pair as the authorized location. Rather, the authorized location may be a defined area (such as a circular area or a polygonal area), a plurality of defined areas, or a plurality of coordinate pairs.

The memory unit 130 stores one or more software programs or features. The authorized location may belong (or correspond) to one software program or feature stored in the memory unit 130 or to a plurality of software programs or features stored in the memory unit 130. Furthermore, a plurality of stored software programs or features may have different authorized locations. For example, one or more first software features stored in the memory unit 130 may correspond to a first authorized location, and one or more second software features stored in the memory unit 130 may correspond a second authorized location, different from the first authorized location.

The control unit 140 controls the overall operations of the above-mentioned components 110, 120, and 130 of the computing device. Moreover, the control unit 140 enables a software feature (or program) stored in the memory unit 130 using, for example, a license key if the current location of the computing device corresponds to the authorized location belonging to the software feature. For example, if an authorized location of (25 degrees, 25 minutes, and 25 seconds north of the equator, and 25 degrees, 25 minutes and 25 seconds west) corresponds to a stored software feature, the control unit 140 enables the software feature if the current location of the computing device is (25 degrees, 25 minutes, and 25 seconds north of the equator, and 25 degrees, 25 minutes and 25 seconds west).

Furthermore, if the control unit 140 enables the software feature, the location unit 110 may periodically determine a new current location of the computing device according to a predetermined time interval, such that the control unit 140 disables the software feature when the computing device leaves the authorized location. That is, if the licensing unit 120 determines that the new current location does not correspond to the authorized location, the control unit 140 disables the software feature. However, it is understood that aspects of the present invention are not limited thereto. Alternatively, once enabled, the software feature may never be disabled or the software feature may be disabled after a predetermined time period.

The authorized location may be embedded in a license key of the software feature. Accordingly, the licensing unit 120 extracts the authorized location from the license key, and the software feature is enabled if the current location determined by the location unit 110 corresponds to the extracted authorized location. In this case, the licensing unit 120 may use a public key to open (or decrypt) the license key upon receipt of the license key, and extract then store the authorized location. Accordingly, when a software feature requiring licensing is to be enabled, the licensing unit 120 queries a current location of the computing device from the location unit 110, and determines if the current location corresponds to the stored authorized location.

According to other aspects, the license key itself may be encrypted with the authorized location, such that the licensing unit 120 determines that the current location corresponds to the authorized location if the licensing unit 140 successfully decrypts the license key with the current location. Specifically, information defining the authorized location (for example, a coordinate pair) may be abstracted to create an encryption key, which is used to encrypt the license key. Accordingly, the license key can only be decrypted if the current location matches the authorized location. Furthermore, the license key is not processed upon receipt, but stored until, for example, the control unit 140 invokes the licensing unit 120 to grant or deny a software feature access request. In this case, the authorized location may also be embedded in the license key such that the control unit 140 disables the software feature when the computing device leaves the authorized location, as described above.

Although the present embodiment has been described with reference to a software feature, it is understood that aspects of the present invention are not limited thereto. For example, according to other aspects, a hardware feature may be enabled according to a location of the computing device. It is further understood that the software feature refers to a software program in its entirety or one or more portions of the software program. Furthermore, license key information may be embedded in the license key describing the features that are to be enabled by the license key. The computing device may be a mobile terminal (such as a personal digital assistant (PDA), a telephone, a notebook computer, and a portable data terminal (PDT)) or a fixed terminal (such as a personal computer).

Figure 2:
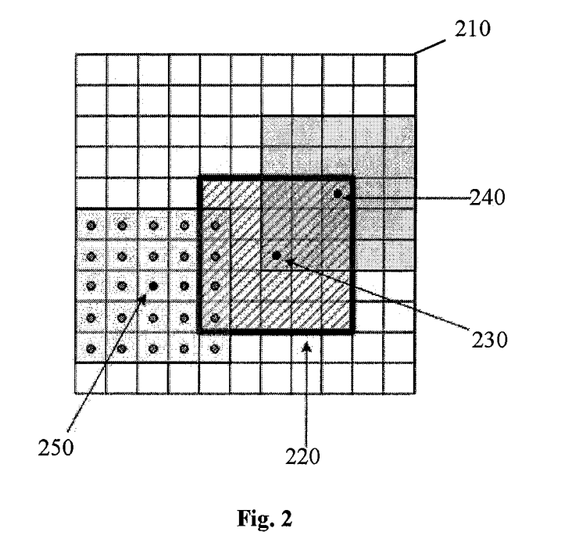
FIG. 2 is an illustration of a geographical map in which a software feature is to be licensed according to an embodiment of the present invention.

Detailed operations of the location unit 110 and the licensing unit 120 will now be described with reference to FIG. 2. FIG. 2 illustrates a geographical map in which a software feature is to be licensed according to an embodiment of the present invention. It is understood that the geographical map illustrated in FIG. 2 is a non-limiting example. Referring to FIG. 2, the location unit 110 rounds all coordinates in the area of the map to be in predetermined increments shared across the map. It is understood that aspects of the present invention are not limited thereto. For example, according to other aspects, one predetermined increment may be applied to a longitudinal axis, while another predetermined increment may be applied to a latitudinal axis. Either way, this effectively results in a grid 210 over the geographical map, where each cell of the grid is a smallest reference unit and each cell has a same size. The authorized location 220 is a predefined square area of the grid with 25 cells. According to other aspects, the authorized location 220 may be a polygonal area, a circular area, or just one cell of the grid.

When the license unit 120 is invoked to license a software feature, the license unit 120 queries the location unit 110 for a current location. Upon determining a current location of the computing device, the location unit 110 converts the location according to the predetermined increments described above. The license unit 120 retrieves information defining the authorized location 220 from the license key. For example, this information may include a coordinate pair of the center 230 of the authorized location 220 and a length of a side of the square area of the authorized location 220. This information is non-encrypted or encrypted with a public key so that the licensing unit 120 can retrieve this information irrespective of a location of the computing device. Accordingly, the licensing unit determines if the current location falls within the authorized location 220 based on this information.

In the case where the license key is encrypted with the authorized location, as described above with reference to FIG. 1, a coordinate pair defining a center 230, for example, of the authorized location 220 may be used to encrypt the license key. Accordingly, the license unit 110 initiates a decryption trial and error loop to decrypt the license key, using the current location 240 or 250 and all rounded coordinate pairs within a square area defined according to the length of the side of the square area of the authorized location 220, whereby the current location 240 or 250 is the center of the square area. Thus, if the current location 240 is within the authorized location 220, one of the coordinate pairs used in the trial and error loop matches the coordinate pair 230 used to encrypt the license key, and will therefore successfully decrypt the license key. Otherwise, the license unit 120 determines that the current location 250 is not within the authorized location 220 after all of the possible coordinates of the square area are used and none successfully decrypt the license key.

Figure 3:
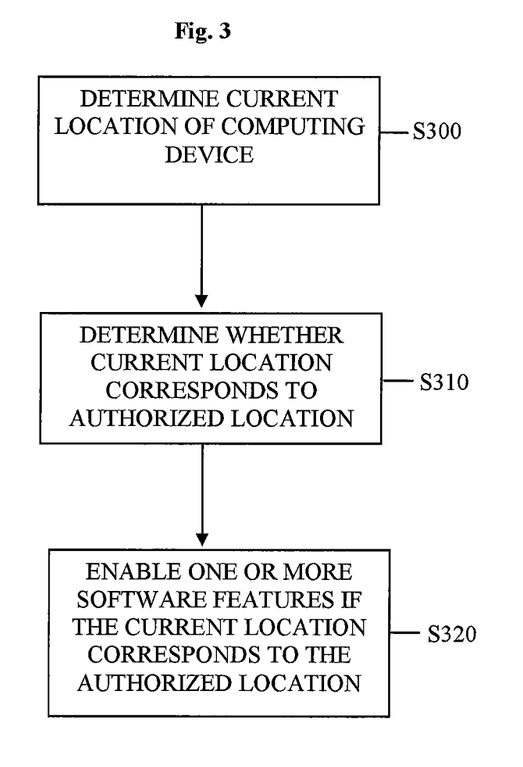
FIG. 3 is a flowchart illustrating a method of provisioning a license key to a computing device according to an embodiment of the present invention.

FIG. 3 is a flowchart illustrating a method of provisioning a license key to a computing device according to an embodiment of the present invention. Referring to FIG. 3, a current location of the computing device is determined in operation S300. Furthermore, location information including a coordinate pair (such as a longitude and latitude coordinate pair) corresponding to the current location of the computing device may be generated. The current location of the computing device may be determined by a GPS receiver.

Then, the current location (operation S300) is compared to a predetermined authorized location in operation S310. The authorized location may be one specific coordinate pair, a defined area, a plurality of coordinate pairs, or a plurality of defined areas. Also, the authorized location may be embedded in a license key or may be used to encrypt the license key, as described above with reference to FIG. 1.

If the current location corresponds to the authorized location (operation S310), one or more software features belonging to the authorized location are enabled using, for example, the license key in operation S320. Furthermore, if the one or more software features are enabled (operation S320), a new current location of the computing device may be periodically checked according to a predetermined time interval such that the one or more software features are disabled if the computing device leaves the authorized location. However, it is understood that aspects of the present invention are not limited thereto. Alternatively, once enabled (operation S320), the one or more software features may never be disabled or the one or more software features may be disabled (e.g., the license key expires) after a predetermined time period.

Figure 4:
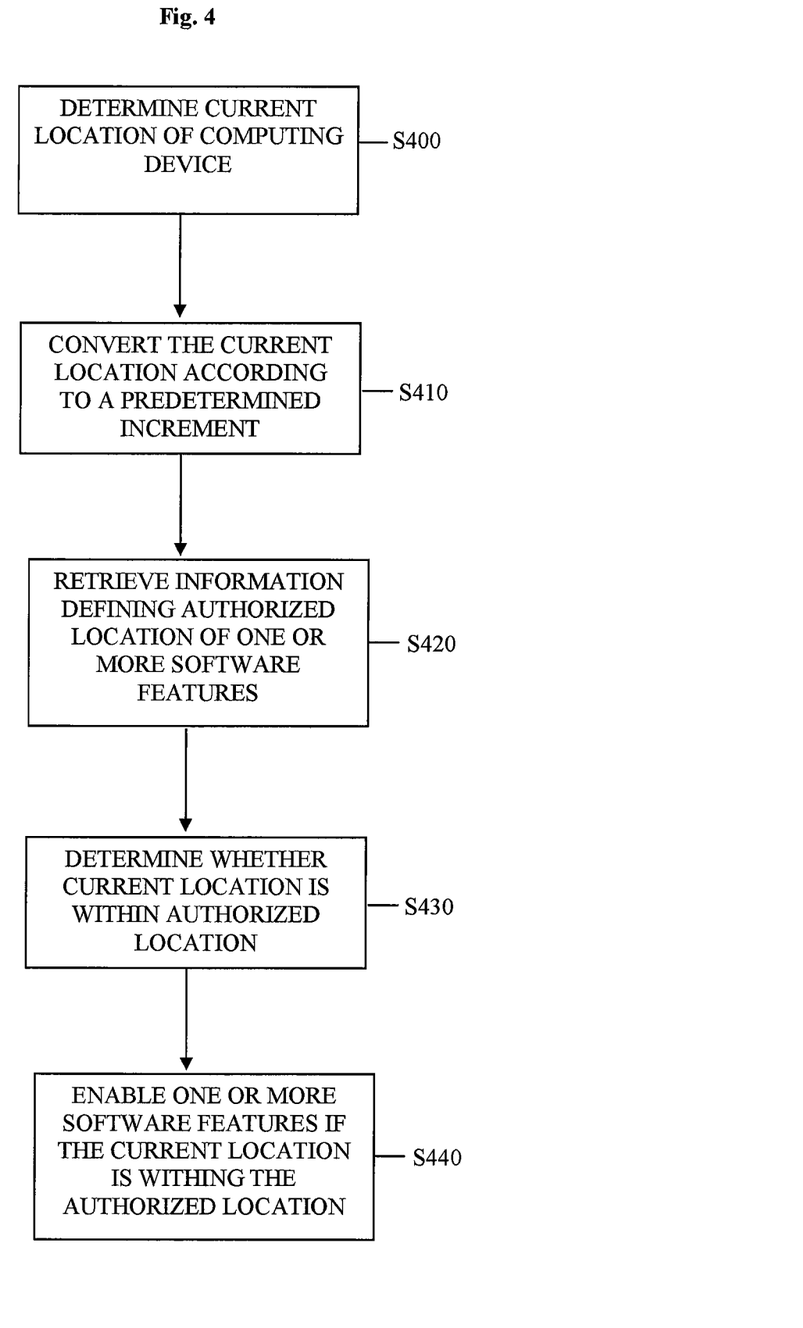
FIG. 4 is a flowchart illustrating a method of provisioning a license key to a computing device according to another embodiment of the present invention.

FIG. 4 is a flowchart illustrating a method of provisioning a license key to a computing device according to another embodiment of the present invention. Referring to FIG. 4, a current location of the computing device is determined in operation S400. Furthermore, location information including a coordinate pair (such as a longitude and latitude coordinate pair) corresponding to the current location of the computing device may be generated. The current location of the computing device may be determined by a GPS receiver.

The current location (operation S400) is converted according to a predetermined increment in operation S410, wherein the predetermined increment is universally applied to all coordinates of an applicable geographical area. According to other aspects, one predetermined increment may be applied to a longitudinal axis, while another predetermined increment may be applied to a latitudinal axis. Either way, this effectively results in a grid corresponding to the geographical area, where each cell of the grid is a smallest reference unit and each cell has a same size.

Information defining an authorized location of one or more software features is retrieved in operation S420. The authorized location may be one specific coordinate pair, a defined area, a plurality of coordinate pairs, or a plurality of defined areas. Also, the authorized location may be embedded in a license key or may be used to encrypt the license key, as described above with reference to FIG. 1. The information defining the authorized location may include, for example, a coordinate pair of the center of the authorized location and a length of a side of a square area of the authorized location, as described above with reference to FIG. 2.

Then, the current location of the computing device (operation S400) is compared to the authorized location to determine if the current location is within the authorized location in operation S430. In the case where the license key is encrypted with the authorized location, as described above with reference to FIG. 1, a coordinate pair defining a center, for example, of the authorized location may be used to encrypt the license key. In this case, a decryption trial and error loop is initiated to decrypt the license key, using the current location (operation S400) and all rounded coordinate pairs within a square area defined according to the length of the side of the square area of the authorized location, whereby the current location is the center of the square area. Thus, if the current location is within the authorized location, one of the coordinate pairs used in the trial and error loop matches the coordinate pair used to encrypt the license key, and will therefore successfully decrypt the license key. Otherwise, the current location is determined to not be within the authorized location after all of the possible coordinates of the square area are used and none successfully decrypt the license key.

If the current location corresponds to the authorized location (operation S430), one or more software features belonging to the authorized location are enabled using the license key in operation S440.

Figure 5:
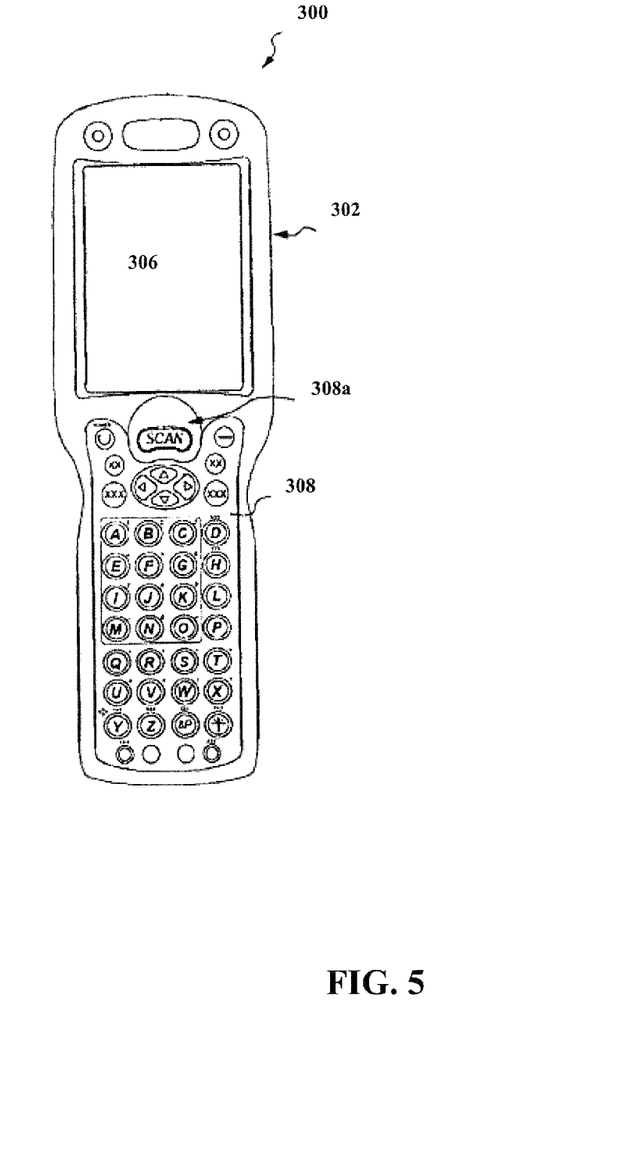
FIG. 5 is a plan view of a PDT 300 according to an embodiment of the present invention.
Figure 6:
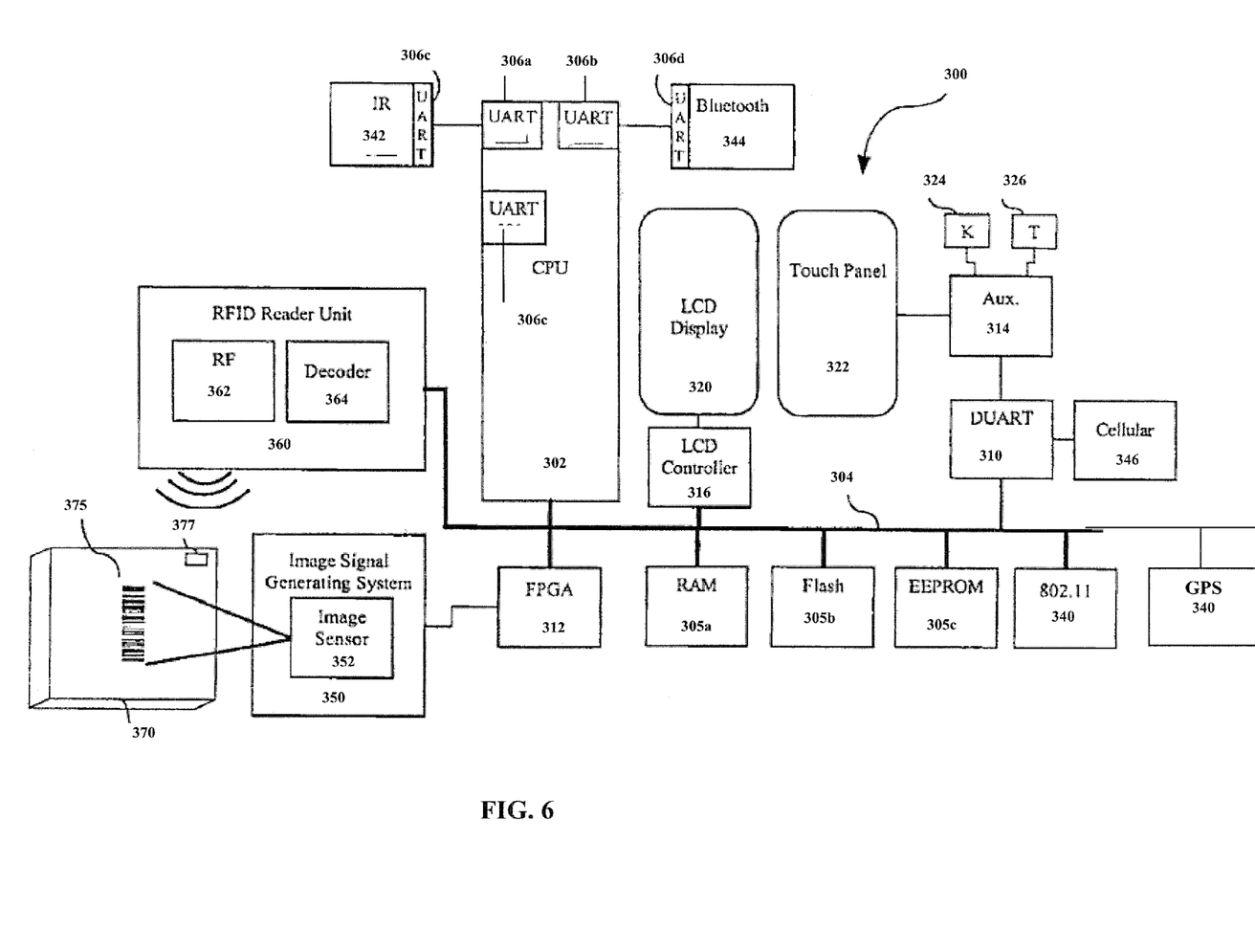
FIG. 6 is a block diagram of a PDT 300 according to an embodiment of the present invention.

FIGS. 5 and 6 illustrate a portable data terminal (PDT) 300 according to an embodiment of the present invention. When viewed at a systems level, PDTs 300 illustrate a variety of sub-systems utilized by mobile computing devices. As such, while the following discussion focuses on PDTs, aspects of the present invention are not limited thereto. That is, aspects of the present invention can be applied to other types of mobile terminals (such as personal digital assistants and telephones) and fixed terminals (such as a personal computer).

PDTs 300 generally integrate a mobile computer, one or more data transport paths, and one or more data collection subsystems. The mobile computer portion is generally similar to known touch screen consumer oriented portable computing devices (for example, Pocket PCs or PDAs), such as those available from PALM, HEWLETT PACKARD, and DELL. The data transport paths include wired and wireless paths, such as 802.11, IrDA, BLUETOOTH, RS-232, USB, CDMA, GSM (including GRPS), etc. The data collection subsystem generally includes a device that captures data from an external source (for example, touches, keystrokes, RFID signals, images, and bar codes). PDTs 300 further distinguish from consumer-oriented mobile computing devices through the use of "industrial" components integrated into a housing that provide increased durability, ergonomics, and environmental independence over consumer-oriented devices. Additionally, PDTs 300 tend to provide improved battery life by utilizing superior batteries and power management systems.

FIG. 5 is a plan view of a PDT 300 according to an embodiment of the present invention. Referring to FIG. 1, the PDT 300 includes an elongated body 302, a battery (not illustrated), a touch screen 306, a keypad 308, a scan engine (not illustrated), and a data/charging port (not illustrated). The PDT 300 also includes a Global Positioning System receiver (not illustrated).

The body 302 may be a water resistant body, and is elongated to support the plurality of components listed above. The tough screen 306 includes a display screen (such as an LCD screen) and a touch sensitive panel. The keypad 308 includes a scan button 308a to initiate data capture via the scan engine. The scan engine may include, for example, one or more of an image engine, a laser engine, and an RFID engine. The data/charging port typically includes a proprietary mechanical interface with, for example, one set of pins or pads to transmit and/or receive data (typically via a serial interface standard such as USB or RS-232) and a second set of pins or pads to receive power for operating the system and/or charging the battery.

The GPS receiver determines a location of the PDT 300. According to aspects of the present invention, permission to use one or more software or hardware features is granted according to the location determined by the GPS receiver. Specifically, software utilizing the scan key 308a may be limited according to a current location as described above with reference to FIGS. 1 through 4, whereby the GPS receiver determines the location of the PDT 300.

FIG. 6 is a block diagram of a PDT 300 according to an embodiment of the present invention. Referring to FIG. 6, the PDT 300 includes a central processing unit (CPU) 302, a main system bus 304, a plurality of memory units 305a, 305b, and 305c, a plurality of Universal Asynchronous Receiver/Transmitter (UART) ports 306a, 306b, 306c, and 306d, a Dual Universal Asynchronous Receiver/Transmitter (DUART) 310, a plurality of secondary processors 312, 314, and 316, a plurality of data input devices 322, 324, and 326, an LCD display 320, a plurality of communication links 340, 342, 344, and 346, a plurality of suitable data collection subsystems 350 and 360, and a GPS receiver 380.

The CPU 302 receives data from and outputs data to the other subsystems for storage, transmission, and additional processing. For example, the CPU 302 receives a current location of the PDT 300 from the GPS receiver 380. Overall operation of the CPU 302 is controlled by software or firmware (typically referred to as an operating system) stored in one or more of the memory units 305n, such as random access memory (RAM) 305a, flash memory 305b, and electrically erasable programmable read-only memory (EEPROM) 305c.

In general, communication between the CPU 202 and the various sub-components takes place via one or more ports or busses, including the main system bus 304, the plurality of UART ports 306a, 306b, 306c, 306d, and 306e, and the DUART 310.

The plurality of secondary processors 312, 314, and 316 perform general and application specific functions. The embodiment illustrated in FIG. 6 includes three such processors: a field programmable gate array (FPGA) 312, an auxiliary processor 314, and an LCD controller 316. The FPGA 312 may include any number of FPGAs, including the Virtex-4 family of FPGAs available from XILINX. The FPGA 312 interfaces with one or more of the data input devices 322, 324, and 326 as described hereinafter. The auxiliary processor 314 may include any number of embedded (or general purpose) processors. The auxiliary processor 314 interfaces with and controls the plurality of data input devices 322, 324, and 326, including a touch sensitive panel 322, a keypad 324, and a scan key or trigger 326. As its name and connections suggest, the LCD controller 316 controls the display of images on the LCD display 320. The combination of the LCD display 320 and the touch sensitive panel 322 is often referred to as a "touch screen."

The plurality of communication links includes an 802.11 communication link 340, an infrared (IR) communication link 342, a Bluetooth communication link 344, and a cellular communication link 346 for communication with a cellular network such as a network in accordance with the Global System for Mobile Communications (GSM) network. The 802.11 communication link 340 interfaces with the CPU 302 via the main system bus 304. The IR communication link 342 and Bluetooth communication link 344 are connected to the CPU 302 via the UART channels 306a, 306b, 306c, 306d, and 306e. The cellular communication link 346 is connected to the CPU 302 via the DUART 310. Wired communication may be conducted via one of the UARTs 306n, such as the UART 306e.

The PDT 300 may be configured to activate a data collection subsystem 350 and 360 or the GPS receiver 380 based on the actuation of a key on the keypad 324 (including the trigger 326) or a touch on the touch panel 322. In addition to the touch panel 322 and keyboard 224, a variety of other data collection subsystems 350 and 360 may be integrated into the PDT 300. In the example shown in FIG. 6, two such systems are illustrated: an image signal generation system 350 and an RFID reader unit 360. Data acquisition subsystems may be controlled with either the main CPU 302 or a secondary processor 312, 314, or 316. For example the image signal generation system 350 is illustrated as being controlled by the FPGA 312. Possible configurations of the FPGA 312 are illustrated in U.S. Pat. No. 6,947,612 incorporated herein by reference. As another example, the RFID reader unit 360 is illustrated as being controlled, via the system bus 304, by the CPU 302.

The image signal generating system 350 generally includes a two dimensional solid state image sensor 352 (such as a CCD, a CMOS, or a CID) for capturing an image containing data (e.g., an image, a bar code 375, or a signature). Two-dimensional solid state image sensors generally have a plurality of photo sensor picture elements ("pixels") which are formed in a pattern including a plurality of rows and a plurality of columns of pixels. The image signal generating system 350 further includes imaging optics (not shown) focusing an image onto an active surface of the image sensor 352. The image sensor 352 may be incorporated on an image sensor IC chip having disposed thereon image sensor control circuitry, image signal conditioning circuitry, and an analog-to-digital converter. The FPGA 312 manages the capture and transfer of image data into memory 305n. Possible configurations of the FPGA 312 are illustrated in U.S. Pat. No. 6,947,612 incorporated herein by reference. Decoding may be performed by the CPU 302 or any secondary processor 312, 314, and 316.

The RFID reader unit 360 includes an RF oscillation and receiver circuit 362 and a data decoder 364. The RFID reader unit 360 may be configured to read RF encoded data from a passive RFID tag, such as tag 377, which may be disposed on article 370. Furthermore, the RFID reader unit 360 may, for example, operate in a selective activation mode or in a continuous read operating mode. In a selective activation mode, the RFID reader unit 360 broadcasts radio signals in an attempt to activate a tag or tags in its vicinity in response to an RFID trigger signal being received. In a continuous read mode, the RF oscillation and receiver circuit 362 continuously broadcasts radio signals in an attempt to actuate a tag or tags in proximity to the PDT 300 automatically, without receiving a trigger signal.

According to aspects of the present invention, one or more of the above-mentioned components of the PDT 300 (such as the image signal generating system 350 and the RFID Reader Unit 360), software features controlling one or more of the abovementioned components of the PDT 300, and/or software features stored in the memory 305n are licensed for use according to a current location of the PDT 300. Specifically, when a user desires to use a specific hardware and/or software feature of the PDT 300, the CPU 302 receives the current location of the PDT 300 from the GPS receiver 380. The CPU 302 determines whether the current location corresponds to an authorized location belonging to the desired hardware and/or software feature. The authorized location may be one coordinate pair, a plurality of coordinate pairs, one defined area, or a plurality of defined areas.

Also, the authorized location may be embedded in a license key of the desired hardware and/or software feature. Accordingly, the CPU 302 extracts the authorized location from the license key, and the desired feature is enabled if the current location corresponds to the extracted authorized location. According to other aspects, the license key itself may be encrypted with the authorized location, such that the CPU 302 determines that the current location corresponds to the authorized location if the CPU 302 successfully decrypts the license key with the current location, as described above with reference to FIGS. 1 and 2.

In the present disclosure, the CPU 302 is described as controlling an authorization to use the desired feature. However, it is understood that according to other aspects, one of the secondary processors 312, 314, and 316 may perform this function for one or more of the software and/or hardware features.

As described above, according to aspects of the present invention, a permission to use a software feature or a hardware feature of a computing device can be controlled according to a current location of the computing device.

Aspects of the present invention can also be embodied as computer-readable codes on a computer-readable recording medium. Also, codes and code segments to accomplish the present invention can be easily construed by programmers skilled in the art to which the present invention pertains. The computer-readable recording medium is any data storage device that can store data which can be thereafter read by a computer system or computer code processing apparatus. Examples of the computer-readable recording medium include read-only memory (ROM), random-access memory (RAM), CD-ROMs, magnetic tapes, floppy disks, and optical data storage devices. The computer-readable recording medium can also be distributed over network-coupled computer systems so that the computer-readable code is stored and executed in a distributed fashion. Aspects of the present invention may also be realized as a data signal embodied in a carrier wave and comprising a program readable by a computer and transmittable over the Internet.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A portable data terminal (PDT) comprising:
a Global Positioning System receiver, wherein the Global Positioning System receiver determines a current location of the PDT;
at least one memory unit, wherein the at least one memory unit stores at least one software feature installed in the PDT;
at least one data input device configured to receive a user input;
a display unit configured to display data generated by the PDT;
at least one communication unit configured to transmit and/or to receive data to/from an outside source;
at least one data collection subsystem configured to generate data according to a received waveform or collected light; and
at least one processing unit, wherein the at least one processing unit is configured to perform a method comprising:
using a license key to enable at least one feature of: the at least one data input device, the display unit, the at least one communication unit, the at least one data collection subsystem, or the at least one software feature installed in the computing device, wherein the license key is associated with the installed at least one software feature and controls permission to use the installed at least one software feature, wherein using the license key comprises:
determining, using the license key, whether the determined current location corresponds to a predetermined authorized location, the predetermined authorized location being associated with the license key, wherein the license key is encrypted using a coordinate pair of a reference point of an area cell of the predetermined authorized location, and wherein determining whether the current location corresponds to the predetermined authorized location comprises:
converting the current location to obtain a coordinate pair of a reference point of an area cell of the current location;
initiating a decryption trial and error routine to decrypt the license key using at least one reference point of at least one area cell of a defined area around the current location, wherein the area cell of the predetermined authorized location matches an area cell of the defined area around the current location, wherein, based on selecting the area cell of the defined area that matches the area cell of the predetermined authorized location, the initiated decryption trial and error routine attempts to decrypt the license key using a coordinate pair of a reference point of the area cell of the defined area, which coordinate pair matches the coordinate pair of the reference point of the area cell of the predetermined authorized location and which is used in encryption of the license key; and
based on successful decryption of the license key using the coordinate pair of the reference point of the area cell of the defined area, determining that the current location corresponds to the predetermined authorized location; and enabling the at least one feature of: the at least one data input device, the display unit, the at least one communication unit, the at least one data collection subsystem, or the at least one software feature when the current location corresponds to the predetermined authorized location.

2. A self-contained portable computing device comprising:
a location unit, wherein the location unit determines a current location of the computing device; and
a processor, wherein the computing device is configured to perform a method comprising:
using a license key to enable a feature installed in the computing device, the license key being associated with the installed feature and controlling permission to use the installed feature, wherein using the license key to enable the feature comprises:
determining, using the license key, whether the determined current location corresponds to a predetermined authorized location, the predetermined authorized location being associated with the license key, wherein the license key is encrypted using a coordinate pair of a reference point of an area cell of the predetermined authorized location, and wherein determining whether the current location corresponds to the predetermined authorized location comprises:
converting the current location to obtain a coordinate pair of a reference point of an area cell of the current location;
initiating a decryption trial and error routine to decrypt the license key using at least one reference point of at least one area cell of a defined area around the current location, wherein the area cell of the predetermined authorized location matches an area cell of the defined area around the current location, wherein, based on selecting the area cell of the defined area that matches the area cell of the predetermined authorized location, the initiated decryption trial and error routine attempts to decrypt the license key using a coordinate pair of a reference point of the area cell of the defined area, which coordinate pair matches the coordinate pair of the reference point of the area cell of the predetermined authorized location and which is used in encryption of the license key; and
based on successful decryption of the license key using the coordinate pair of the reference point of the area cell of the defined area, determining that the current location corresponds to the predetermined authorized location; and
enabling the feature installed in the computing device when the determined current location corresponds to the predetermined authorized location.

3. The computing device as claimed in claim 1, wherein the method further comprises:
based on enabling the feature, periodically determining a new current location of the computing device according to a predetermined time interval; and
disabling the feature when the new current location does not correspond to the authorized location.

4. The computing device as claimed in claim 1, wherein the predetermined authorized location comprises an area including N number of area cells, each area cell of the N area cells having a predetermined size and each area cell of the N areas cells being referenced by a coordinate pair of a reference point of the respective area cell.

5. The computing device as claimed in claim 1, wherein the predetermined authorized location comprises an area including N number of area cells, each area cell of the N areas cells having a predetermined size, and each area cell of the N areas cells being referenced by a coordinate pair of a reference point of the respective area cell, wherein determining whether the current location corresponds to the predetermined authorized location comprises:
obtaining a coordinate pair of a reference point of a center area cell of the N area cells of the predetermined authorized location;
obtaining area information about the predetermined authorized location, wherein the obtained area information includes at least one of: a length of at least one edge of the predetermined authorized location, a radius or a diameter of the predetermined authorized location, a shape of the predetermined authorized location, or an area of the predetermined authorized location;
identifying, based on the obtained coordinate pair of the reference point of the center area cell and based on the obtained area information, the N area cells of the predetermined authorized location; and
wherein the decryption trial and error routine iteratively attempts to decrypt the license key using one or more reference point of one or more of the identified N area cells of the predetermined authorized location.

6. The computing device as claimed in claim 5, wherein the reference point of the center area cell, and the obtained area information, are embedded in a non-encrypted portion of the license key.

7. A method of enabling a feature of a self-contained portable computing device, the method comprising:
using a license key to enable a feature installed in the computing device, the license key being associated with the installed feature and controlling permission to use the installed feature, wherein using the license key to enable the feature comprises:
determining, using the license key, whether a current location determined by a location unit of the computing device corresponds to a predetermined authorized location, the predetermined authorized location being associated with the license key, wherein the license key is encrypted using a coordinate pair of a reference point of an area cell of the predetermined authorized location, and wherein determining whether the current location corresponds to the predetermined authorized location comprises:
converting the current location to obtain a coordinate pair of a reference point of an area cell of the current location;
initiating a decryption trial and error routine to decrypt the license key using at least one reference point of at least one area cell of a defined area around the current location, wherein the area cell of the predetermined authorized location matches an area cell of the defined area around the current location, wherein, based on selecting the area cell of the defined area that matches the area cell of the predetermined authorized location, the initiated decryption trial and error routine attempts to decrypt the license key using a coordinate pair of a reference point of the area cell of the defined area, which coordinate pair matches the coordinate pair of the reference point of the area cell of the predetermined authorized location and which is used in encryption of the license key; and based on successful decryption of the license key using the coordinate pair of the reference point of the area cell of the defined area, determining that the current location corresponds to the predetermined authorized location; and enabling, by a processor of the self-contained portable computing device, the feature installed in the computing device when the determined current location corresponds to the predetermined authorized location.

8. The method as claimed in claim 7, further comprising:

based on enabling the feature, periodically determining a new current location of the computing device according to a predetermined time interval; and disabling the feature when the new current location does not correspond to the authorized location.

9. The method as claimed in claim 7, wherein the predetermined authorized location comprises an area including N number of area cells, each area cell of the N area cells having a predetermined size and each area cell of the N area cells being referenced by a coordinate pair of a reference point of the respective area cell.

10. The method as claimed in claim 7, wherein the predetermined authorized location comprises an area including N number of area cells, each area cell of the N area cells having a predetermined size, and each area cell of the N area cells being referenced by a coordinate pair of a reference point of the respective area cell, wherein determining whether the current location corresponds to the predetermined authorized location comprises:

obtaining a coordinate pair of a reference point of a center area cell of the N area cells of the predetermined authorized location;

obtaining area information about the predetermined authorized location, wherein the obtained area information includes at least one of: a length of at least one edge of the predetermined authorized location, a radius or a diameter of the predetermined authorized location, a shape of the predetermined authorized location, and/or an area of the predetermined authorized location;

identifying, based on the obtained coordinate pair of the reference point of the center area cell and based on the obtained area information, the N area cells of the predetermined authorized location; and wherein the decryption trial and error routine iteratively attempts to decrypt the license key using one or more reference point of one or more of the identified N area cells of the predetermined authorized location.

11. The method as claimed in claim 10, wherein the reference point of the center area cell, and the obtained information, are embedded in a non-encrypted portion of the license key.

* * * * *